United States Patent [19]

Vessey

[11] 4,214,373
[45] Jul. 29, 1980

[54] GRADE CHECKER

[76] Inventor: William R. Vessey, 16442 Harbour La., Huntington Beach, Calif. 92649

[21] Appl. No.: 947,728

[22] Filed: Oct. 2, 1978

[51] Int. Cl.² .................. G01C 9/00; G01C 5/00; G01C 15/00
[52] U.S. Cl. ........................... 33/277; 33/282; 33/286
[58] Field of Search .............. 33/276, 277, 282, 286, 33/287, 289

[56] References Cited

U.S. PATENT DOCUMENTS

| | | | |
|---|---|---|---|
| 688,826 | 12/1901 | Clark | 33/287 |
| 3,300,861 | 1/1967 | Lilly | 33/289 |

Primary Examiner—Steven L. Stephan

Attorney, Agent, or Firm—Fulwider, Patton, Rieber, Lee & Utecht

[57] ABSTRACT

A grade checker for determining the elevation of a grade relative to a pair of reference points spaced apart on opposite sides of the grade. The checker comprises an elongated sighting tube vertically orientable between the reference points and including a pair of inclined, oppositely facing reflecting surfaces at its lower extremity. The sighting tube can be raised to horizontally align the reflecting surfaces with the reference points, as determined by viewing through a window at the upper extremity of the sighting tube. The amount by which the sighting tube must be raised to effect such alignment is indicated, thereby indicating the elevation of the grade relative to the reference points.

3 Claims, 5 Drawing Figures

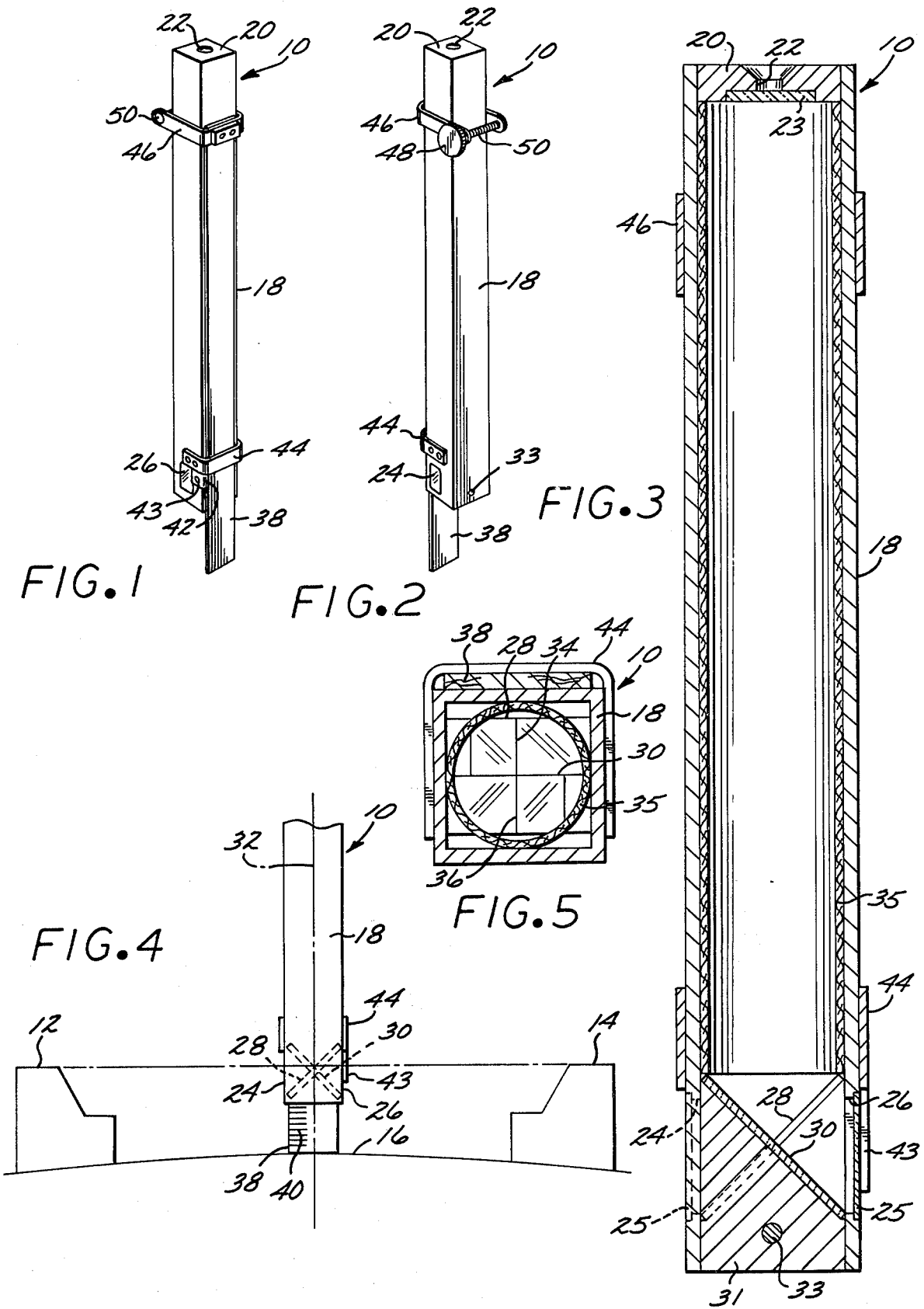

GRADE CHECKER

BACKGROUND OF THE INVENTION

1. Field of the Invention:

The present invention relates to a grade checker for determining the elevation of a grade relative to a pair of reference points spaced apart on opposite sides of the grade.

2. Description of the Prior Art:

Various means are available to determine the height of a grade, as in construction work, but most of these are either relatively expensive or are time consuming and require more than one person to operate. For example, in establishing the height or grade of a road bed between opposite street curbs, it is usual practice to determine or check the accuracy of the grade by stretching a cord between the curbs and measuring the vertical height of the cord above the road bed. Typically, three men are required to perform this operation, one at each of the curbs to maintain the cord in position on the curbs, and a third man to measure the height of the cord at its mid-point above the road bed. The described method is time consuming and relatively expensive, particularly for inspectors who would prefer to have a means by which a more rapid check of the grade can be made by one man.

SUMMARY OF THE INVENTION

According to the present invention, a grade checker is provided which quickly and easily enables a determination of the elevation of the grade, such as a road bed, relative to a pair of reference points spaced apart on opposite sides of the grade, such as a pair of street curbs. The checker includes an elongated sighting tube which is adapted to be vertically disposed between the pair of reference points. A grade engaging element is mounted to the sighting tube and is longitudinally extensible relative to the sighting tube for elevating the tube until a pair of inclined, oppositely facing light directing means or reflecting surfaces located in the lower extremity of the sighting tube are horizontally aligned with the spaced reference points. Such alignment can be determined by viewing through a viewing window at the upper extermity of the sighting tube and comparing the relative positions of the juxtaposed images of the reference points.

One man can easily carry the device, no wires or cords are needed, and the sighting tube includes means such as a scale for easily determining the height of the reflecting surfaces, and hence the elevation of the grade, once horizontal alignment of the reference point images is attained.

Other objects and features of the invention will become apparent from consideration of the following description taken in connection with the accompanying drawings.

BRIEF DESCRIPTION OF THE DRAWINGS

FIG. 1 is a perspective view of a grade checker according to the present invention, generally illustrating the front side;

FIG. 2 is a perspective view similar to FIG. 1, but generally showing the opposite side of the checker;

FIG. 3 is an enlarged longitudinal cross sectional view of the checker of FIG. 1;

FIG. 4 is a partially diagrammatic elevational view showing the checker in position between spaced apart street curbs; and FIG. 5 is an enlarged view taken along the line 5—5 of FIG. 4.

DESCRIPTION OF THE PREFERRED EMBODIMENT

Referring now to the drawings, a grade checker 10 according to the present invention is illustrated in operative position midway between a pair of street curbs 12 and 14 for determining the elevation of the associated grade 16 relative to the upper surfaces of the curbs, which constitute the targets or reference points.

The determination of the elevation of the grade 16 relative to the curbs 12 and 14 is a typical application for the present grade checker 10. In constructing a road bed, after the contractor prepares the sub-grade, lays down the base material, and applies the final wearing layer, such as asphaltic concrete or the like, the finished grade should define a smooth crown rising from the base of the curbs 12 and 14 to a higher midpoint. As will be seen, the present grade checker 10 is uniquely adapted to measure the elevation of the midpoint of the grade 16 relative to the upper horizontal surfaces of the curbs 12 and 14.

The grade checker 10 comprises, generally, an elongated sighting tube 18 made of aluminum or any suitable material, and preferably characterized by a generally square transverse cross section. The upper end of the tube 18 is closed by an upper end plate 20 provided with a central circular opening constituting a viewing window 22 which is preferably covered by a transparent section 23 of clear plastic or glass, as seen in FIG. 3.

The lower extremity of the sighting tube 18 includes a pair of oppositely facing, generally rectangular openings constituting target windows 24 and 26, which are covered by sections 25 of a protective transparent material such as plastic or glass. Internally of the windows 24 and 26 are located light directing means in the form of a pair of adjacent reflecting surfaces or mirrors 28 and 30 which are operative, respectively, to direct toward the viewing window 22 any light entering through the target windows 24 and 26, respectively, and along paths parallel to the longitudinal axis 32 of the sighting tube 18.

Although the light directing means is shown in the form of a pair of mirrors 28 and 30, it will be apparent to those skilled in the art that other light directing means can be employed, if desired, such as prisms or the like. Each mirror is disposed at an angle of 45° to the longitudinal axis 32 of the sighting tube 18, as best seen in FIG. 4, with the resulting orientation of the plane of the reflecting surface of mirror 28 being disposed at an angle of 90° to the corresponding reflecting surface of the mirror 30.

The mirrors 28 and 30 are located in side-by-side, adjacent relationship, with each mirror occupying approximately half the width of the hollow interior of the lower extremity of the tube 18, as best seen in FIG. 5.

Although other suitable arrangements will suggest themselves to those skilled in the art, the mirrors 28 and 30 are conveniently held in the described orientations by adhesive adherence of the mirrors to inclined faces machined or otherwise formed in a lower block 31. The block 31 is adapted to be slidably received within the lower extremity of the tube 18 and held in position by threaded fasteners, one of which is illustrated at 33 in FIG. 3. Alignment of the block 31 for reception of the fasteners is facilitated by an elongated paper tube 35 disposed within the tube 18 and abutting at its lower end against the upper end of the block 31 when the block 31 is in proper position.

The target windows 24 and 26 are dimensioned to approximate the size of the mirrors 28 and 30, respectively. With this arrangement, the target images 34 and 36 of the upper surfaces of the street curbs 12 and 14 are alignable, as shown in FIG. 5, when the sighting tube 18 is vertically disposed approximately midway between the curbs 12 and 14, and elevated to a position such that the target windows 24 and 26 are in horizontal alignment, respectively, with the upper surfaces of the street curbs 12 and 14.

Elevation of the sighting tube 18 is accomplished by longitudinal extension of an elongated grade engaging element or scale 38 provided with equally spaced markings or indicia 40 to indicate the extent of longitudinal extension of the scale 38 relative to a mark or indicator 42 provided on an indicator plate 43 fastened to the side of the sighting tube 18, as by a screw fastener or the like.

It will be apparent to those skilled in the art that the indicator 42 can be located anywhere along the length of the sighting tube 18 so long as the indicia 40 on the scale 38 are complementally calibrated to provide a correct indication of the extent of longitudinal extension of the scale 38 relative to the tube 18. In addition, the position of the indicia 40 and indicator 42 can be reversed, as will be apparent, so that the indicia 40 is on the tube 18 and the indicator 42 on the scale 38.

One form of structure for slidably mounting the scale 38 to the tube 18 includes a pair of U-shape brackets 44 and 46, which overlie the scale 38 at their mid portions, with their opposite legs extending along opposite sides of the tube 18. The lower bracket 44 is attached in spaced relation to the sides of the tube 18 by suitable screw fasteners so that the scale is slidable relative to the bracket 44. The mid portion of the bracket 46 is attached to the upper end of the scale 38, and its opposite legs extend past the opposite sides of the tube 18 and are clamped together by rotation of a tightening knob 48 threadably mounted to one end of a threaded stud 50 extending through one of the legs and mounted to the opposite leg. Loosening the knob 48 permits the scale 38 and bracket 46 to slide longitudinally along the length of the tube 18.

In operation, the sighting tube 18 is vertically oriented approximately midway between the curbs 12 and 14 with the target windows 24 and 26 facing toward the curbs 12 and 14, respectively. The knob 48 is loosened sufficiently to enable the scale 38 to be extended until the target images 34 and 36 are aligned as shown in FIG. 5. The verticality of the tube 18 can be checked by tipping the tube 18 slightly toward and away from the curbs 12 and 14 to see if there is any significant change in the alignment of the images 34 and 36 with one another. If not, the operator then can read the elevation of the grade 16 relative to the upper surfaces of the curbs 12 and 14 by referring to the indicia 40 which is in alignment with the indicator 42. In this manner one man can quickly and easily check the grade without the assistance of other persons.

Various modifications and changes may be made with regard to the foregoing detailed description without departing from the spirit of the invention.

I claim:

1. A grade checker for determining the elevation of a grade relative to a pair of reference points spaced apart on opposite sides of the grade, said checker comprising:

an elongated sighting tube adapted for location between the pair of reference points, the upper extremity of said sighting tube including a viewing window, and the lower extremity of said sighting tube including a pair of oppositely facing target windows;

light directing means located in said lower extremity of said sighting tube adjacent said target windows and defining a pair of oppositely inclined, side-by-side reflecting surfaces located adjacent said target windows, respectively, and operative to display to a viewer at said viewing window, aligned images of said reference points each aligned with respect to the other when said target windows are in said alignment with said reference points; and, a grade engaging element mounted to said sighting tube and longitudinally extensible relative to said sighting tube for elevating said target windows into alignment, respectively, with said reference points, said sighting tube and said grade engaging element including indication means formed thereon for indicating the amount of relative longitudinal extension therebetween whereby the elevation of said grade may be determined.

2. A grade checker according to claim 1 wherein said light directing means comprises a pair of mirrors defining said reflecting surfaces, respectively, said mirrors each being inclined at an angle of 45 degrees relative to the longitudinal axis of said sighting tube.

3. A grade checker according to claim 1 wherein one of said grade engaging element and said sighting tube includes longitudinally spaced indicia, and the other of said grade engaging element and said sighting tube includes an indicator whereby the amount of relative longitudinal extension therebetween can be determined to thereby establish the elevation of said grade.

* * * * *